US009016702B2

United States Patent
Huang

(10) Patent No.: US 9,016,702 B2
(45) Date of Patent: Apr. 28, 2015

(54) SCOOTER FOLDABLE SEAT STRUCTURE

(71) Applicant: Laing Ban International Inc., Taoyuan County (TW)

(72) Inventor: Wen-Hung Huang, Taoyuan (TW)

(73) Assignee: Laing Ban International Inc., Taoyuan County (TW)

( * ) Notice: Subject to any disclaimer, the term of this patent is extended or adjusted under 35 U.S.C. 154(b) by 0 days.

(21) Appl. No.: 14/158,669

(22) Filed: Jan. 17, 2014

(65) Prior Publication Data

US 2014/0203538 A1    Jul. 24, 2014

(30) Foreign Application Priority Data

Jan. 18, 2013   (TW) ................................ 102201223

(51) Int. Cl.
| | |
|---|---|
| *B62K 15/00* | (2006.01) |
| *B62J 1/08* | (2006.01) |
| *A47C 1/126* | (2006.01) |
| *B62J 1/00* | (2006.01) |
| *B62K 3/00* | (2006.01) |
| *B60N 2/30* | (2006.01) |

(52) U.S. Cl.
CPC ................. *B62J 1/08* (2013.01); *B62K 15/008* (2013.01); *B62K 15/006* (2013.01); *B60N 2/30* (2013.01); *A47C 1/126* (2013.01); *B62K 2700/56* (2013.01); *B60N 2/3093* (2013.01); *B62J 1/00* (2013.01); *B62K 3/00* (2013.01)

(58) Field of Classification Search
CPC .............. B62K 15/008; B62K 15/006; B62K 2700/56; A47C 1/126; B60N 2/30; B60N 2/3093; B62J 1/08; B62J 1/00

USPC .............. 280/278, 287, 87.01, 87.02, 87.021, 280/87.03, 87.041, 639; 180/208; 297/5, 6, 297/16.2, 15, 378.12, 53

See application file for complete search history.

(56) References Cited

U.S. PATENT DOCUMENTS

| 254,325 | A | * | 2/1882 | Jackson | .......................... 297/15 |
|---|---|---|---|---|---|
| 1,231,156 | A | * | 6/1917 | Heaslet | ........................... 297/15 |
| D57,894 | S | * | 5/1921 | Eklund | ........................ D21/423 |
| 1,611,307 | A | * | 12/1926 | Forse | ....................... 280/87.021 |

(Continued)

FOREIGN PATENT DOCUMENTS

| CN | 202439803 | * | 9/2012 |
|---|---|---|---|
| WO | WO 2014/114063 | * | 7/2014 |

*Primary Examiner* — J. Allen Shriver II
*Assistant Examiner* — Emma K Frick
(74) *Attorney, Agent, or Firm* — Muncy, Geissler, Olds & Lowe, P.C.

(57) ABSTRACT

A scooter foldable seat structure comprising an elongated plate body is disclosed, wherein a footplate and a seat plate pivotally connect to two ends of the plate body respectively; an elongated front supporting element pivotally connected to a bottom side of the plate body; a first movable connecting element foldably connected to the bottom side of the plate body and the front supporting element respectively; an elongated rear supporting element pivotally connected to a bottom side of the seat plate; and a second movable connecting element foldably connected to the bottom side of the seat plate and the rear supporting element respectively. Thereby, the front supporting element, the first movable connecting element, the seat plate, the rear supporting element and the second movable connecting element can be folded away and accommodated under the plate body at the same time and unfolded to provide the stable seat plate to sit on.

12 Claims, 5 Drawing Sheets

(56) References Cited

U.S. PATENT DOCUMENTS

| | | | |
|---|---|---|---|
| 1,658,068 A * | 2/1928 | White | 280/87.041 |
| 2,439,556 A * | 4/1948 | Bancroft | 280/87.041 |
| 3,572,757 A * | 3/1971 | Camps | 180/208 |
| 3,623,749 A * | 11/1971 | Jensen | 280/278 |
| 3,979,136 A * | 9/1976 | Lassiere | 280/278 |
| 4,026,573 A * | 5/1977 | Richardson | 280/278 |
| 4,611,818 A * | 9/1986 | Cammarata | 280/278 |
| 4,623,163 A * | 11/1986 | Potts | 280/649 |
| 6,425,590 B1 * | 7/2002 | Whiteside et al. | 280/32.6 |
| 6,695,334 B2 * | 2/2004 | Irlbacher | 280/278 |
| 6,851,498 B1 * | 2/2005 | Sauve | 180/208 |
| 6,969,077 B2 * | 11/2005 | Liu | 280/30 |
| 7,077,229 B2 * | 7/2006 | Lee | 180/220 |
| 7,125,080 B1 * | 10/2006 | Jarema et al. | 297/411.32 |
| 7,416,197 B2 * | 8/2008 | Mackin et al. | 280/87.041 |
| 7,451,848 B2 * | 11/2008 | Flowers et al. | 180/208 |
| 7,654,356 B2 * | 2/2010 | Wu | 180/208 |
| 7,703,567 B2 * | 4/2010 | Wang | 180/208 |
| 7,882,918 B2 * | 2/2011 | Chin et al. | 180/220 |
| 7,886,855 B2 * | 2/2011 | Wang | 180/65.1 |
| 7,954,577 B2 * | 6/2011 | Wang | 180/65.1 |
| 8,388,014 B2 * | 3/2013 | Wu et al. | 280/638 |
| 8,413,753 B2 * | 4/2013 | Wu et al. | 180/208 |
| 8,459,610 B2 * | 6/2013 | Su et al. | 254/2 C |
| 8,776,932 B1 * | 7/2014 | Bussinger et al. | 180/208 |
| 8,801,010 B2 * | 8/2014 | Deb | 280/87.05 |
| 8,827,284 B2 * | 9/2014 | Walther et al. | 280/87.041 |
| 2005/0173175 A1 * | 8/2005 | Lee | 180/208 |
| 2009/0020350 A1 * | 1/2009 | Wu | 180/208 |
| 2012/0193160 A1 * | 8/2012 | Wu et al. | 180/208 |

* cited by examiner

SCOOTER FOLDABLE SEAT STRUCTURE

BACKGROUND OF THE INVENTION

1. Field of Invention

The present invention relates to a scooter and more particularly to a scooter foldable seat structure for a user to ride on in a standing or sitting posture and with a seat which can be folded conveniently.

2. Related Art

Because of the lightweight and compactness of scooter and its excellent mobility, it is widely used by people and has become popular and trendy around the world. Regardless of the conventional manpower scooter or the electrical type, users have to ride on it by standing on a footplate.

SUMMARY OF THE INVENTION

The common manpower scooter is lighter than the electrical type and requires less effort to push it with foot. However, the electrical scooter requires much more effort to push with foot without the drive by electric. Furthermore, even though the electrical scooter can be driven electrically and conveniently to save energy; it is the same as the conventional type, both types require the user to ride in a standing posture for a long period of time and cause burden to the user physically.

In view of the above, a scooter foldable seat structure of the present invention is provided to improve the above drawbacks and to achieve the following objectives.

A primary objective of the present invention is to provide a scooter foldable seat structure for a user to ride on an electrical scooter in a standing or sitting posture in order to achieve the effects of exercising and obtain rest for saving physical strength.

A secondary objective of the present invention is to provide a scooter foldable seat structure with a seat which can be foldably disposed on a footplate for saving space and for the user to stand on; and the seat can be unfolded and positioned stably above the footplate for the user to ride on in a sitting posture.

In order to achieve the above-mentioned objectives, the scooter foldable seat structure of the present invention is disposed above a footplate. The foldable seat structure comprises a plate body, a front supporting element, a first movable connecting element, a seat plate, a rear supporting element and a second movable connecting element. The plate body is elongated with a long axial end pivotally connected to the footplate. The front supporting element is elongated with a long axial end pivotally connected to a bottom side of the plate body. The first movable connecting element is movably and foldably connected to the bottom side of the plate body and the front supporting element respectively in order that the front supporting element can be unfolded or folded relative to the plate body. An end of the seat plate is pivotally connected to another long axial end of the plate body. The rear supporting element is elongated with a long axial end pivotally connected to a bottom side of the seat plate. The second movable connecting element is movably and foldably connected to the bottom side of the seat plate and the rear supporting element respectively in order that the rear supporting element can be unfolded or folded relative to the seat plate.

When the scooter foldable seat structure is embodied, an elongated accommodating space is disposed between the two long axial ends of the plate body for folding away and accommodating the front supporting element, the first movable connecting element, the seat plate, the rear supporting element and the second movable connecting element.

When the scooter foldable seat structure is embodied, the front supporting element is disposed with an elongated groove. The first movable connecting element comprises a first connecting element, and the first connecting element is disposed with a first elongated guiding groove. An end of the first connecting element is pivotally connected to the bottom side of the plate body. The front supporting element is disposed with a first guiding bar penetrating through the first elongated guiding groove. A width of the elongated groove is slightly larger than a width of the first connecting element for accommodating the first connecting element.

When the scooter foldable seat structure is embodied, the rear supporting element is disposed with an elongated trough. The second movable connecting element comprises a second connecting element, and the second connecting element is disposed with a second elongated guiding groove. An end of the second connecting element is pivotally connected to the bottom side of the seat plate. The rear supporting element is disposed with a second guiding bar penetrating through the second elongated guiding groove. A width of the elongated trough is slightly larger than a width of the second connecting element for accommodating the second connecting element.

When the scooter foldable seat structure is embodied, when the front supporting element and the seat plate are unfolded, an end of the front supporting element is pressed against on the footplate, and an end of the rear supporting element is pressed against on a top side of the plate body.

The present invention will become more fully understood by reference to the following detailed description thereof when read in conjunction with the attached drawings.

DETAILED DESCRIPTION OF THE INVENTION

A scooter foldable seat structure of the present invention is disposed above a footplate. The scooter foldable seat structure comprises a plate body, a front supporting element, a first movable connecting element, a seat plate, a rear supporting element and a second movable connecting element. A long axial end of the plate body is pivotally connected to the footplate. A long axial end of the front supporting element is pivotally connected to a bottom side of the plate body. The first movable connecting element is movably and foldably connected to the bottom side of the plate body and the front supporting element respectively. An end of the seat plate is pivotally connected to another long axial end of the plate body. A long axial end of the rear supporting element is pivotally connected to a bottom side of the seat plate. The second movable connecting element is movably and foldably connected to the bottom side of the seat plate and the rear supporting element respectively.

Figure 1:
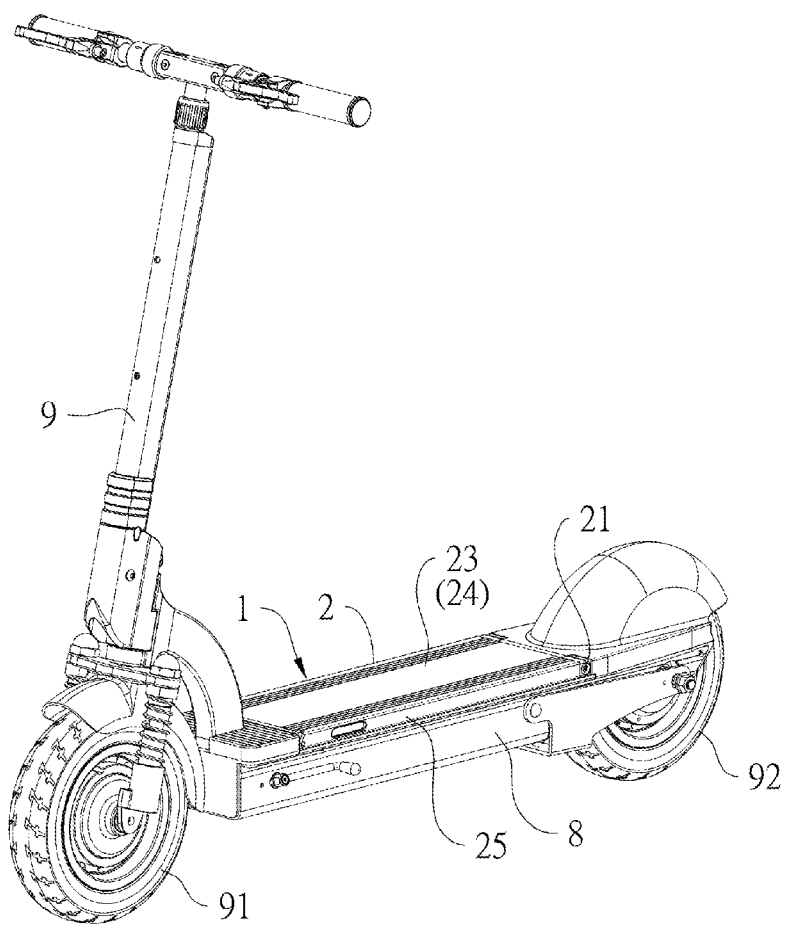
FIG. 1 is a perspective view of a scooter foldable seat structure of the disclosure being assembled and folded on a scooter.
Figure 2:
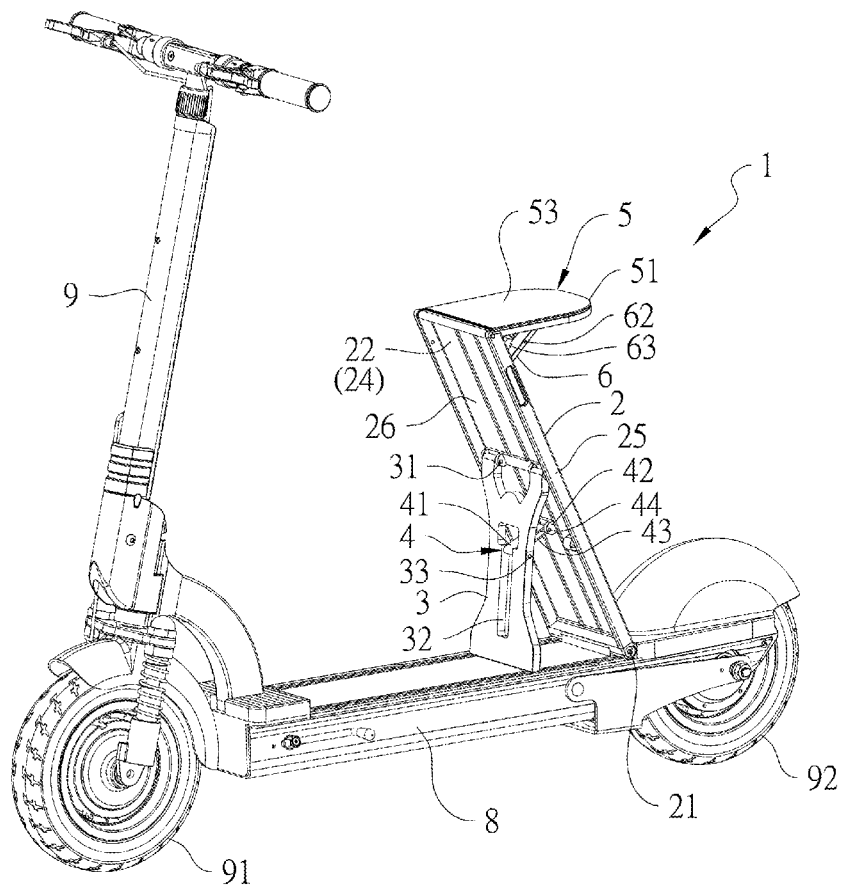
FIG. 2 is a perspective view of the scooter foldable seat structure of the disclosure being assembled and unfolded on the scooter.
Figure 3:
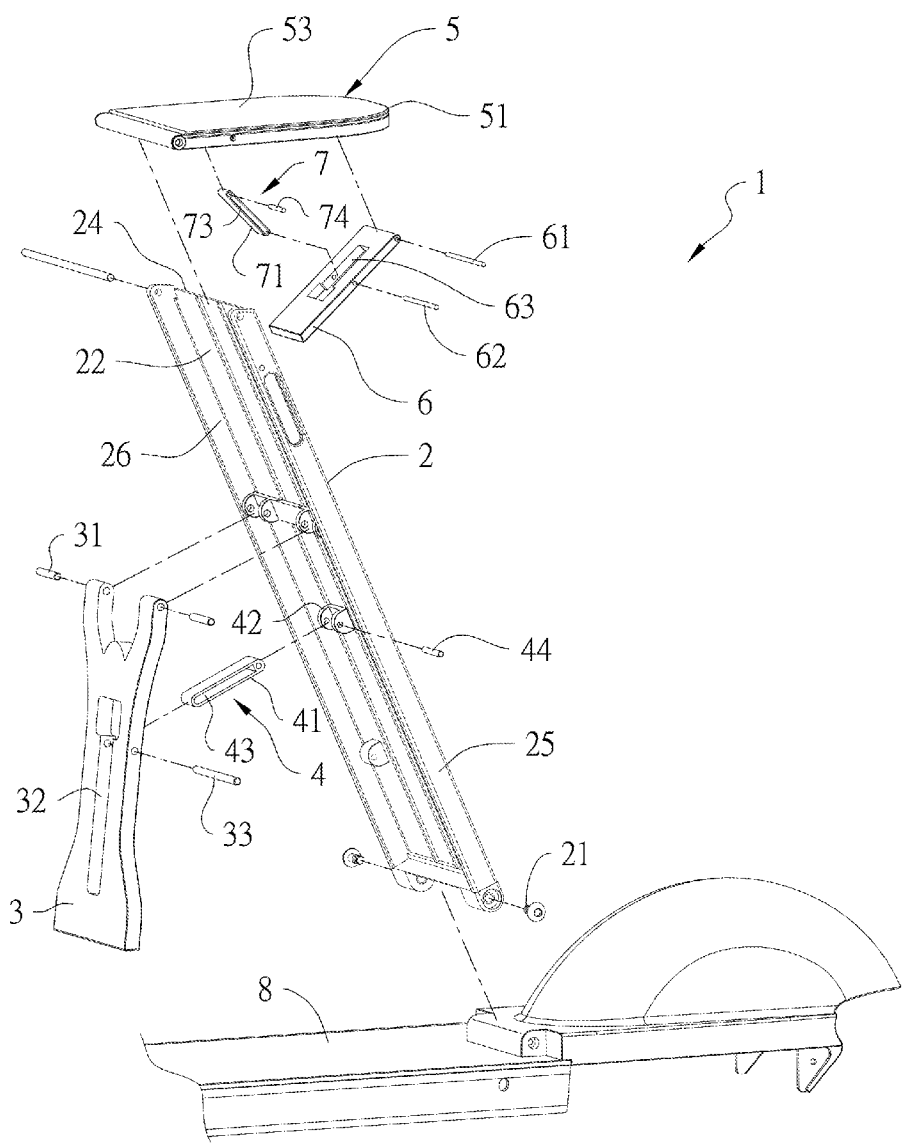
FIG. 3 is a perspective exploded view of the scooter foldable seat structure of the disclosure.

Please refer to FIGS. 1 to 3. The figures show a scooter foldable seat structure 1 according to a preferred embodiment of the disclosure. The foldable seat structure 1 comprises a plate body 2, a front supporting element 3, a first movable connecting element 4, a seat plate 5, a rear supporting element 6 and a second movable connecting element 7. In this embodiment, a front wheel 91 of a scooter 9 is defined as the front end; and a rear wheel 92 of the scooter 9 is defined as the rear end.

The plate body 2 is in a rectangular shape, and a long axial rear end of the plate body 2 is pivotally connected to a read end of a footplate 8 by a pivot 21. The plate body 2 comprises a bottom side 22 and a reversely disposed top side 23. The plate body 2 has a top plate 24, and a side plate 25 is extended downwardly from a left and a right side of the top plate 24 respectively. An elongated accommodating space 26 is formed between the top plate 24 and the two side plates 25 on the left and right.

The front supporting element 3 is an elongated plate, and a long axial front end of the front supporting element 3 is pivotally connected to a bottom side of the top plate 24 of the plate body 2 by a pivot 31. A width of the front supporting element 3 is slightly smaller than a width of the accommodating space 26. An elongated groove 32 is disposed at and penetrated through a central portion of the front supporting element 3. A first guiding bar 33 is fixed in the front supporting element 3 and penetrated through the elongated groove 32.

The first movable connecting element 4 comprises a first connecting element 41 and a first fixing element 42. A width of the first connecting element 41 is slightly smaller than a width of the elongated groove 32 of the front supporting element 3. The first connecting element 41 is disposed with a first elongated guiding groove 43. The first elongated guiding groove 43 is sleeved around the first guiding bar 33; in another word, the first guiding bar 33 is penetrated through the first elongated guiding groove 43 for enabling the first guiding bar 33 to move inside the first elongated guiding groove 43 limitedly. The first fixing element 42 is fixed on the bottom side of the top plate 24 of the plate body 2. An end of the first connecting element 41 is pivotally connected to the first fixing element 42 by a first axial bar 44. In embodying, the end of the first connecting element 41 can also be pivotally connected to the first guiding bar 33; and the first elongated guiding groove 43 is sleeved around the first axial bar 44 for enabling the front supporting element 3 to move and fold relative to the plate body 2.

The seat plate 5 has an upper plate 51. A front end of the upper plate 51 is pivotally connected to the long axial front end of the plate body 2. The upper plate 51 comprises a bottom side 52 and a reversely disposed top side 53. A framed accommodating space 54 is formed under the bottom side 52 of the upper plate 51 as shown in FIG. 4.

The rear supporting element 6 is an elongated plate with a long axial rear end pivotally connected to the bottom side 52 of the upper plate 51 of the seat plate 5 by a pivot 61. A width of the rear supporting element 6 is slightly smaller than a width of the accommodating space 54. An elongated trough 63 is disposed at and penetrated through a central portion of the rear supporting element 6. A second guiding bar 62 is disposed in the rear supporting element 6, and the second guiding bar 62 is penetrated through the elongated trough 63.

Figure 4:
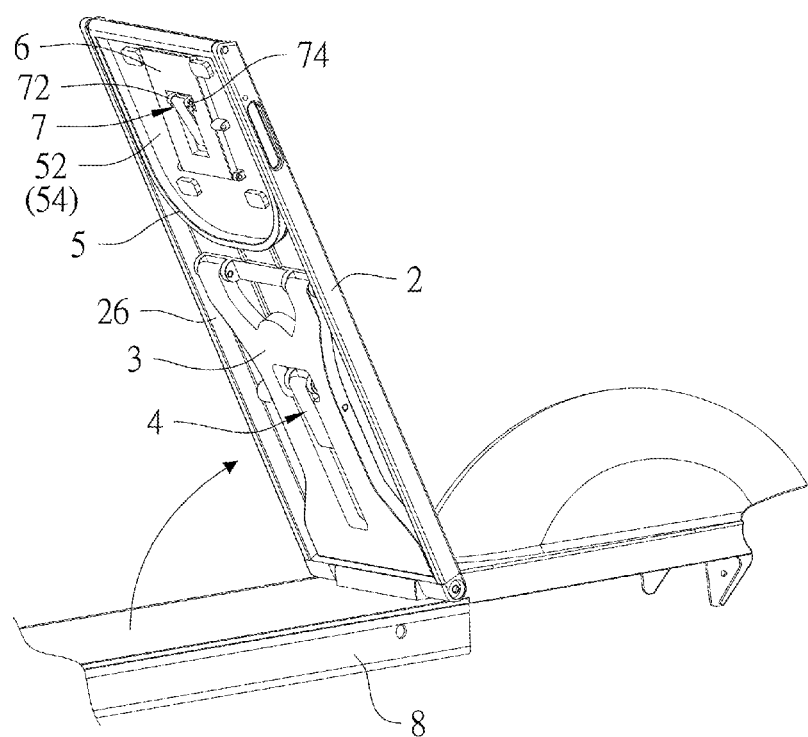
FIGS. 4 and 5 are schematic views of the unfolding statuses of the scooter foldable seat structure of the disclosure.

The second movable connecting element 7 comprises a second connecting element 71 and a second fixing element 72 as shown in FIG. 4. A width of the second connecting element 71 is slightly smaller than a width of the elongated trough 63 of the rear supporting element 6. The second connecting element 71 is disposed with a second elongated guiding groove 73. The second elongated guiding groove 73 is sleeved around the second guiding bar 62; in another word, the second guiding bar 62 is penetrated through the second elongated guiding groove 73 for enabling the second guiding bar 62 to move inside the second elongated guiding groove 73 limitedly. The second fixing element 72 is fixed on the bottom side 52 of the upper plate 51 of the seat plate 5. An end of the second connecting element 71 is pivotally connected to the second fixing element 72 by a second axial bar 74. In embodying, the end of the second connecting element 71 can also be pivotally connected to the second guiding bar 62; and the second elongated guiding groove 73 is sleeved around the second axial bar 74 for enabling the rear supporting element 6 to move and fold relative to the seat plate 5.

Figure 5:
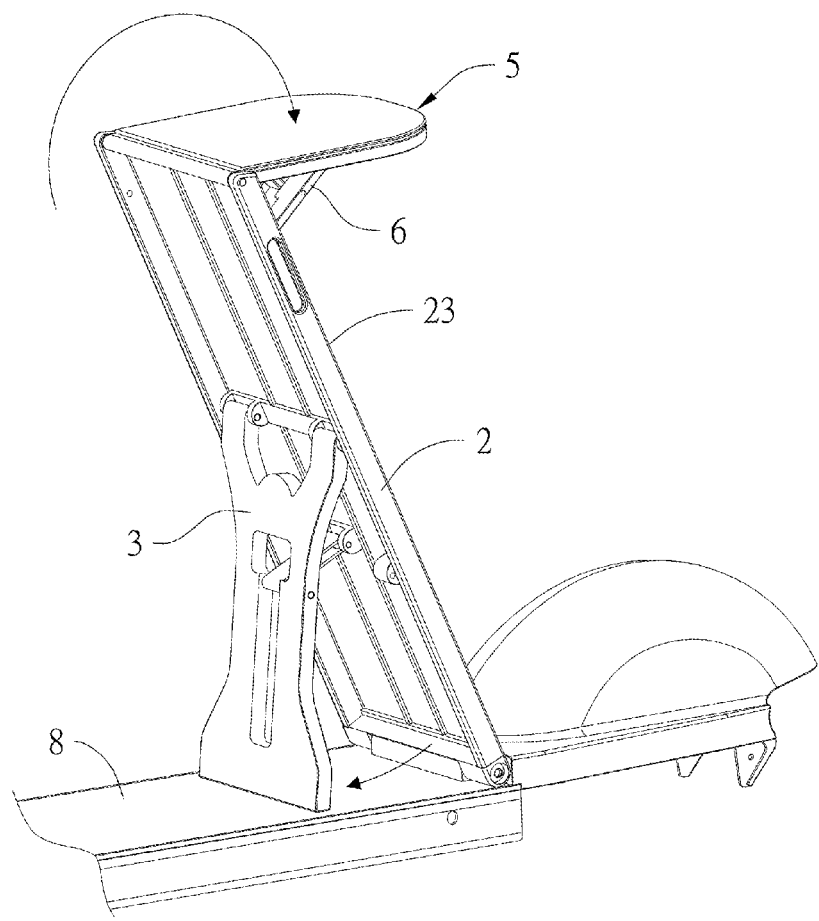

Please refer to FIG. 4. Based on the combinations of the above components, the front supporting element 3, the first movable connecting element 4, the seat plate 5, the rear supporting element 6 and the second movable connecting element 7 can be folded away and accommodated in the accommodating space 26 under the plate body 2 at the same time as shown in the status in FIG. 1 for a user to step on the plate body 2. As shown in FIGS. 4 and 5, the user lifts the front end of the plate body 2 upward and pushes the front supporting element 3 forward in order to make a rear end of the front supporting element 3 to press against on the footplate 8 for forming a stable supporting structure; and turns the seat plate 5 and makes a front end of the rear supporting element 6 to press downwardly against the top side 23 of the plate body 2 for providing the seat plate 5 a stable support for the user to sit on.

Therefore, the present invention has the following advantages:

1. The scooter foldable seat structure enables the user to ride on an electrical scooter in a standing or sitting posture in order to achieve the effects of exercising and obtain rest for saving physical strength.

2. The scooter foldable seat structure enables the seat to be folded away and positioned on the footplate as well as unfolded and positioned stably above the footplate. Therefore, not only that space can be saved effectively, the user can ride on the scooter in a standing posture or in a sitting posture comfortably.

As a conclusion from the above descriptions, the expected objectives can be achieved by the scooter foldable seat structure of the present invention which enables the user to ride on the scooter in a standing posture or in a sitting posture and the seat to be folded away conveniently.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A scooter foldable seat structure for disposing above a footplate, the foldable seat structure comprising:
an elongated plate body with a long axial end pivotally connected to the footplate, the plate body comprising a bottom side and a reversely disposed top side;
an elongated front supporting element with a long axial end pivotally connected to the bottom side of the plate body, wherein the front supporting element is disposed with an elongated groove and a first guiding bar;
a first movable connecting element movably and foldably connected to the bottom side of the plate body and the front supporting element respectively for enabling the front supporting element to unfold or fold relative to the plate body, wherein the first movable connecting element comprises a first connecting element, and the first connecting element is disposed with a first elongated guiding groove for the first guiding bar to penetrate through the first elongated guiding groove, and an end of the first connecting element is pivotally connected to the bottom side of the plate body;

a seat plate with an end pivotally connected to another long axial end of the plate body, the seat plate comprising a bottom side and a reversely disposed top side;

an elongated rear supporting element with a long axial end pivotally connected to the bottom side of the seat plate; and a second movable connecting element movably and foldably connected to the bottom side of the seat plate and the rear supporting element respectively for enabling the rear supporting element to unfold or fold relative to the seat plate.

2. The scooter foldable seat structure as claimed in claim 1, wherein a width of the elongated groove is slightly larger than a width of the first connecting element for accommodating the first connecting element.

3. The scooter foldable seat structure as claimed in claim 1, wherein the rear supporting element is disposed with an elongated trough, and the second movable connecting element comprises a second connecting element, and the second connecting element is disposed with a second elongated guiding groove.

4. The scooter foldable seat structure as claimed in claim 3, wherein an end of the second connecting element is pivotally connected to the bottom side of the seat plate, and the rear supporting element is disposed with a second guiding bar penetrating through the second elongated guiding groove.

5. The scooter foldable seat structure as claimed in claim 3, wherein a width of the elongated trough is slightly larger than a width of the second connecting element for accommodating the second connecting element.

6. The scooter foldable seat structure as claimed in claim 1, wherein when the front supporting element and the seat plate are unfolded, an end of the front supporting element is pressed against on the footplate, and an end of the rear supporting element is pressed against on the top side of the plate body.

7. The scooter foldable seat structure as claimed in claim 1, wherein an elongated accommodating space is disposed between the two long axial ends of the plate body for folding away and accommodating the front supporting element, the first movable connecting element, the seat plate, the rear supporting element and the second movable connecting element.

8. The scooter foldable seat structure as claimed in claim 7, wherein a width of the elongated groove is slightly larger than a width of the first connecting element for accommodating the first connecting element.

9. The scooter foldable seat structure as claimed in claim 7, wherein the rear supporting element is disposed with an elongated trough, and the second movable connecting element comprises a second connecting element, and the second connecting element is disposed with a second elongated guiding groove.

10. The scooter foldable seat structure as claimed in claim 9, wherein an end of the second connecting element is pivotally connected to the bottom side of the seat plate, and the rear supporting element is disposed with a second guiding bar penetrating through the second elongated guiding groove.

11. The scooter foldable seat structure as claimed in claim 9, wherein a width of the elongated trough is slightly larger than a width of the second connecting element for accommodating the second connecting element.

12. The scooter foldable seat structure as claimed in claim 7, wherein when the front supporting element and the seat plate are unfolded, an end of the front supporting element is pressed against on the footplate, and an end of the rear supporting element is pressed against on the top side of the plate body.

* * * * *